Aug. 15, 1950      F. E. KIRK      2,519,051
ELECTRIC HEATING APPLIANCE
Filed Sept. 13, 1947      2 Sheets-Sheet 1
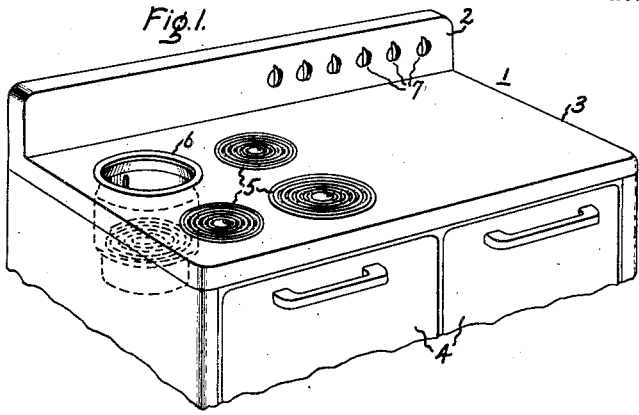
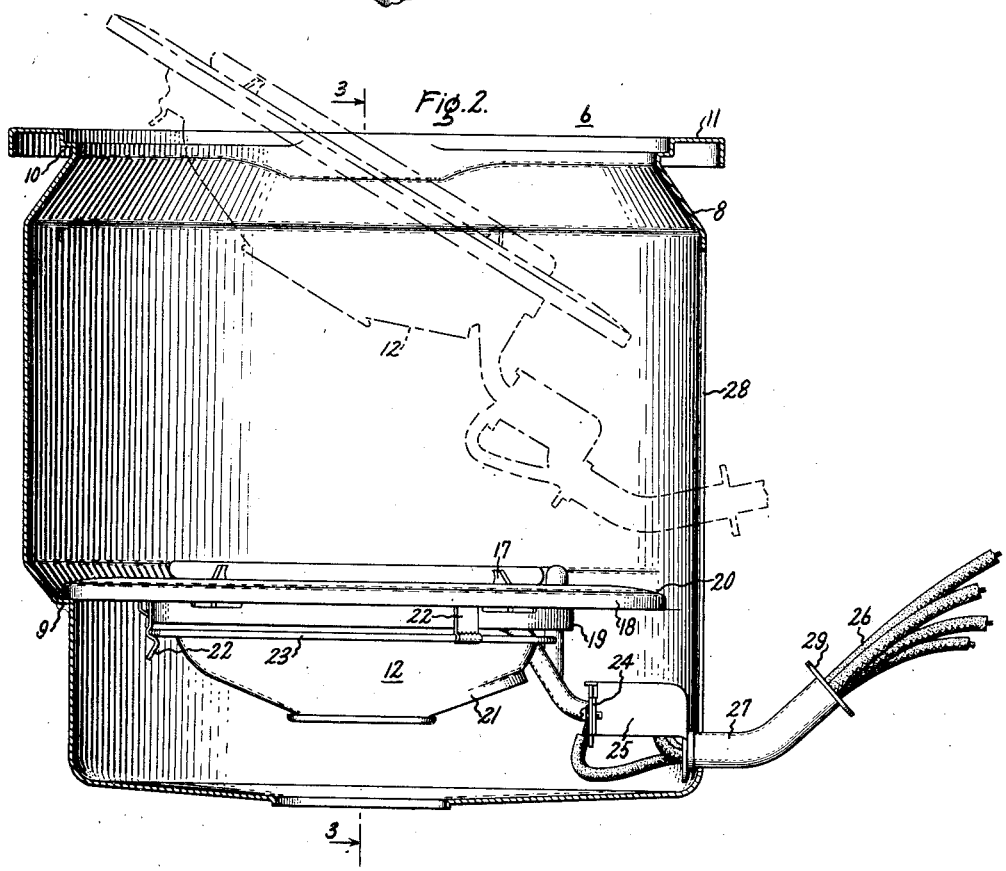
Inventor:
Francis E. Kirk,
by Alfred T. Bobst
His Attorney.

Aug. 15, 1950 — F. E. KIRK — 2,519,051
ELECTRIC HEATING APPLIANCE
Filed Sept. 13, 1947 — 2 Sheets-Sheet 2
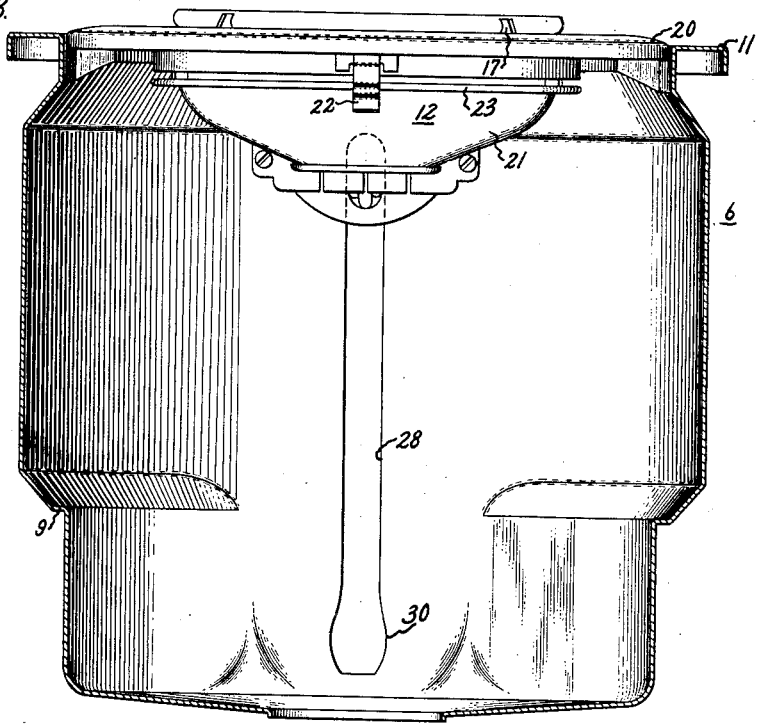
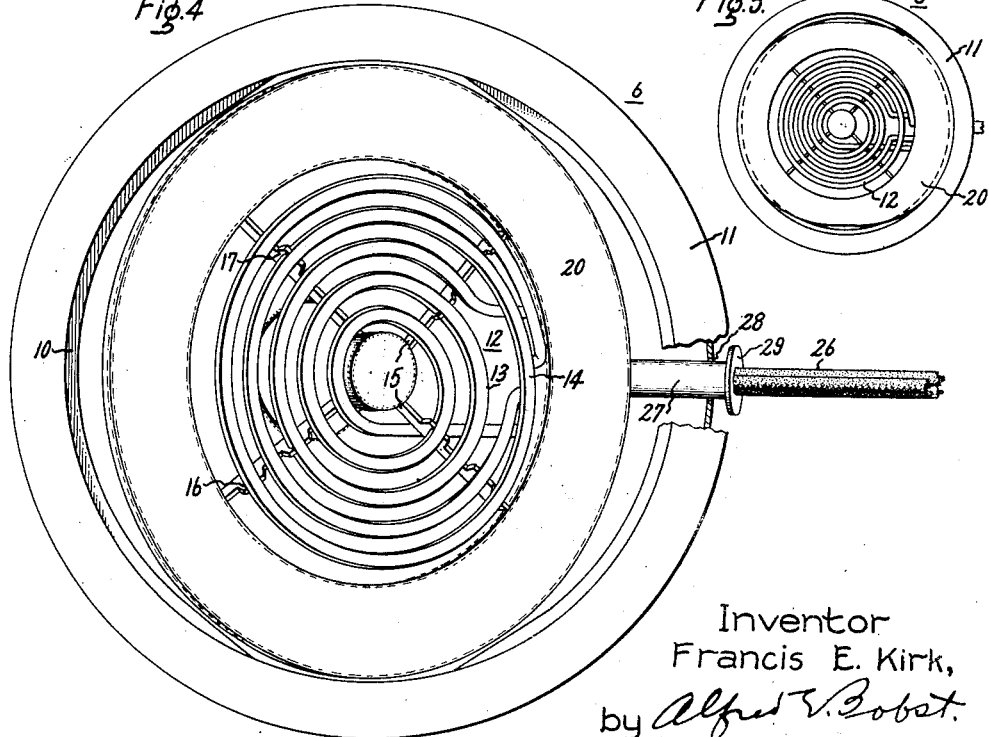
Inventor
Francis E. Kirk,
by Alfred V. Bobst.
His Attorney Patented Aug. 15, 1950

2,519,051

UNITED STATES PATENT OFFICE 2,519,051

ELECTRIC HEATING APPLIANCE

Francis E. Kirk, Oak Park, Ill., assignor to Hotpoint Inc., Chicago, Ill., a corporation of New York Application September 13, 1947, Serial No. 773,802

8 Claims. (Cl. 219—37)

The present invention relates to a domestic appliance and in particular to a deep well cooking device for electric ranges wherein an electric heating unit is located at the bottom of the well and, it has as its primary purpose the provision of new and improved means for adjustably mounting the electric heating unit in such a device.

The deep well cooking device is a special purpose domestic appliance which is often provided on electric ranges. The common surface heating unit arrangement for such a range comprises three electric heating units and one deep well cooking unit. As the cooking characteristics of the different units vary considerably, use of the deep well cooker is confined to special purpose cooking. Frequently, it is not used over considerable periods of time and consequently the space occupied by the cooker is wasted.

It is, therefore, an object of the present invention to provide a new and improved multiple purpose deep well cooking appliance of simple and inexpensive construction with an electric heating unit easily adjustable to surface and bottom cooking postions.

This and other objects are obtained in accordance with one form of the present invention by providing a new and improved deep well cooker comprising a deep well cooking receptacle with supporting seats adjacent the top and bottom of the receptacle and an electric unit with a supporting member adapting the unit to positioning on the supporting seats when the unit is in a horizontal plane and adjustment of the unit from one position to the other when the unit is angularly tilted.

Further objects and advantages of my invention will become apparent as the following description proceeds and the features of novelty which characterize my invention will be pointed out with particularity in the claims annexed to and forming a part of this specification.

For a better understanding of my invention reference may be had to the accompanying drawings in which Fig. 1 is a perspective view of the upper portion of a typical electric range embodying the present invention; Fig. 2 is an enlarged side view of the deep well cooker with the receptacle in section; Fig. 3 is an enlarged sectional view of the deep well cooker taken along the lines 3—3 of Fig. 2; Fig. 4 is a plan view illustrating the unit in its adjustable position and Fig. 5 is a reduced plan view illustrating one modification of my invention.

Referring now to the drawings and more particularly to Fig. 1 there is illustrated an electric range 1 comprising a back splasher 2, a top wall 3 and oven and storage compartments 4. Mounted in the top wall 3 are surface units 5 and the deep well cooker 6 embodying the subject matter of the present invention. Electrical circuit connections determining the power input to the deep well cooker 6 and the surface units 5 are controlled through switches (not shown) mounted on the back splasher 2 and manually adjustable by the turning knobs 7.

The preferred embodiment of the deep well cooker of my invention is illustrated in Figs. 2 and 3 and comprises a generally cylindrical receptacle 8 formed with inwardly extending support seats 9 and 10 adjacent the bottom and top respectively of the receptacle 8. An outwardly extending flange member 11 having a diameter greater than the major diameter of the cylindrical receptacle 8 provides a supporting member for the receptacle in an aperture on the surface units side of the top wall 3.

The electrical heating unit 12 comprises a pair of sheathed heating elements 13 and 14 lying in a common plane which in the heating position are substantially parallel to the top wall of the range. These heating elements may and preferably will be constructed as described in U. S. Patent to C. C. Abbott Number 1,367,341 dated February 1, 1921.

Figure 4 of the drawings illustrates two heating elements 13 and 14 mounted on the arms 15 of a grid comprising four arms joined (not shown) at the center of the unit and extending radially outwardly in angles of 90° to each other. These arms are provided with notches 16 in which the turns of the heating elements 13 and 14 are received and which are provided with peened over sections 17 that firmly grip the turns and hold them in their proper relation to each other. The outer ends of the arms 15 are mounted in a supporting member 18 which, as shown in Figure 2, comprises a vertically positioned circular member 19 and an outwardly extending flange member 20.

Positioned under the heat generating elements 13 and 14 and under the grid which supports them and under the supporting member 18 is a reflector 21 which is removably attached to the supporting member 18 by notched holding members 22 fixedly attached to the circular member 19. The reflector is roughly parabolic in shape and has at its marginal edge an outwardly extending flange 23 which is removably mounted in the notches of the holding members 22.

The terminal ends of the heating elements 13 and 14 project outwardly and downwardly and are protected from spillage by a suitable metallic shield 24 which is fixedly attached to each of the terminal ends, by any suitable means. The terminals of the heating elements 13 and 14 are electrically connected and suitably insulated by a terminal block (not shown) which is housed within a metallic housing 25 attached to the terminal shield 24 by any suitable manner as, for example, by machine screws. Electrical power input leads or conductors 26 are carried to the terminals through a metallic conduit 27 fixedly attached to the metal housing 25 and extending through and slidable in a vertically positioned slot 28 in the side wall of the receptacle 8. The conduit 27 is flared at its outer end forming a circular flange 29 having a cross sectional diameter exceeding the width of the slot 28. The conduit 27 protects the lead wires 26 from wear and breakage during the adjustment of the unit from one position to the other. The flange 29 provides a stop to prevent the unit from being withdrawn from the receptacle 8 during the adjustment. However, in case the unit needs servicing, an enlarged portion 30 of slot 28 affords means for passing flange 29 through slot 28 for withdrawing the unit from receptacle 8.

To provide for adjusting the heating unit 12 to its upper or lower position in receptacle 8, the upper supporting seat or flange 10 is formed to define an aperture of irregular cross section in the top of the receptacle 8. The aperture or opening has a transverse dimension in one direction exceeding the cross sectional diameter of the heating unit 12 and a transverse dimension in an angularly disposed direction less than the cross sectional diameter of the electrical heating unit 12. In the form of the invention shown in Figs. 1 to 4 the aperture has roughly the shape of an ellipse, as shown. With the upper supporting flange 10 formed as hereinabove described, a space is provided in the aperture defined by the upper supporting flange 10 for passing the unit upwardly or downwardly through the aperture when the unit is tilted angularly, as shown in Figs. 2 and 4.

With the electrical unit 12 and receptacle 8 formed in the manner hereinabove described the unit 12 may be adjusted to either the top or bottom positions in the receptacle 8 by grasping the unit 12 and tilting it and thereafter moving it upwardly or downwardly through the aperture by presenting the tilted unit to the aperture across its greater transverse dimension. After the unit 12 has been moved through the aperture, it is returned to its horizontal position and is rested upon the upper or lower supporting members.

Fig. 4 of the drawing is a plan view of the receptacle and unit illustrating the unit in a tilted position (shown by broken lines in Figure 2) for movement upwardly or downwardly through the aperture defined by the upper supporting flange 10 in the manner hereinabove described.

More specifically, if the heating unit be resting on the lower seat 9, and it is dsired to operate it as a surface unit, the unit is grasped and lifted from the seat 9; as it is being elevated through the receptacle it is tilted to an angular position, shown in dotted-dashed lines in Fig. 2, and is passed up through the longer dimension of the elliptical aperture defined by flange 10 to a position above this flange; then it is dropped down onto the flange, the unit being supported thereby in its horizontal cooking position. To return it to its lower position, it is elevated from the flange 10, cocked to the angular position of Fig. 2 and then lowered through the elliptical opening, after which it is brought to its horizontal position of rest on the flange 9.

Fig. 5 illustrates another modification of my invention wherein the upper supporting seat or flange 10 of the receptacle 8 defines a circular aperture in the top of the receptacle 8; and the electric heating unit supporting flange 20 is formed roughly in the shape of an ellipse with a dimension parallel to the major axis greater than the cross sectional dimension of the aperture defined by the upper supporting member or flange 10 and a dimension parallel to the minor axis less than the cross sectional dimension of the aperture defined by the upper supporting member or flange 10. With this construction, the electric heating unit may be tilted angularly about the axis of its minor dimension and passed upwardly or downwardly through the aperture in the top of the receptacle 8 thereafter returning the unit to a horizontal position for resting it upon either the upper or lower supporting members.

With the deep well cooking appliance such as I have shown and described hereinabove, an electric range has the desirable characteristics of being adapted to deep well cooking with the advantage of economical cooking of large quantities of foods at low heat, and, moreover, the top surface cooking area may be increased by a simple and easy adjustment of the electric heating unit in the deep well to provide four surface heating units when they are desired.

While I have shown particular embodiments of my invention it will be understood, of course, that I do not wish to be limited thereto since many modifications may be made, and, I therefore, contemplate by the appended claims to cover any such modifications as fall within the true spirit and scope of the invention.

What I claim as new and desire to secure by Letters Patent of the United States is:

1. An electric cooking appliance comprising a receptacle having upper and lower supports, said upper support being a flange member adjacent the top of said receptacle, a heating unit movable therein, said unit having a flange member adapting it to rest on said upper or lower supports, one of said flange members having an irregular annular contour with a transverse dimension in one direction greater than the transverse dimension in an angularly disposed direction, the other of said flange members having a maximum transverse dimension intermediate the transverse dimensions of said flange with the irregular annular contour whereby said unit may be moved into cooperative relationship with said supports by angularly displacing said unit so as to provide a space between said flange members, moving said unit past said flange member adjacent the top of said receptacle and thereafter disposing said unit in a position to rest on one of said supports.

2. An electric cooking appliance comprising a receptacle having upper and lower supports, said upper support being a flange member adjacent the top of said receptacle, a heating unit movable therein, said unit having a flange member adapting it to rest on said upper or lower supports, one of said flange members having a generally elliptical contour with maximum and minimum transverse dimensions, the other of said flange members having a generally circular contour with a maximum transverse dimension intermediate the transverse dimensions of said flange member having a generally elliptical contour whereby said unit may be moved into cooperative relationship with said supports by angularly disposing said unit so as to provide space between said flange members, moving said unit past said flange member adjacent the top of said receptacle and thereafter disposing said unit in a position to rest on one of said supports.

3. A combination deep well and surface unit cooking appliance comprising a pair of vertically spaced seats and a cooking unit movable from one to the other of said seats and adapted to seat on either in a cooking position, one of said cooking unit and the upper seat having a wall defining an irregular contour so that it has a major dimension and a minor dimension at an angle thereto and the other of said members having a wall defining a substantially circular contour, the diameter of which is such that said unit can be directed up from said lower seat through the upper by cocking it at an angle to its cooking position so that said minor dimension of the first wall passes said diameter of the second wall, and said diameter further so dimensioned that said unit may be supported by said upper seat by the interengagement of the major dimension of said first wall with said second wall.

4. A combination deep well and surface unit cooking appliance comprising a pair of vertically spaced seats and a cooking unit movable from one to the other of said seats and adapted to seat on either in a cooking position, one of said cookunit and the upper seat having a wall defining an irregular contour so that it has a major dimension and a minor dimension at an angle thereto and the other of said members having a wall defining a substantially circular contour, the diameter of which is such that said unit can be directed up from said lower seat through the upper by cocking it at an angle to its cooking position so that said minor dimension of the first wall passes said diameter of the second wall, and said diameter further so dimensioned that said unit may be supported by said upper seat by the interengagement of the major dimension of said first wall with said second wall, and said appliance further comprising a cylindrical wall supporting said seats and having a vertical slot therein and said heating unit having an electric supply conductor element directed through said slot.

5. A combination deep well and surface unit cooking appliance comprising a pair of vertically spaced seats and a cooking unit movable from one to the other of said seats and adapted to seat on either in a cooking position, one of said cooking unit and the upper seat having a wall defining an irregular contour so that it has a major dimension and a minor dimension at an angle thereto and the other of said members having a wall defining a substantially circular contour, the diameter of which is such that said unit can be directed up from said lower seat through the upper by cocking it at an angle to is cooking position so that said minor dimension of the first wall passes said diameter of the second wall, and said diameter further so dimensioned that said unit may be supported by said upper seat by the interengagement of the major dimension of said first wall with said second wall, and said appliance further comprising a cylindrical wall supporting said seats and having a vertical slot therein and said heating unit having a rigid electric supply conductor element directed through said slot, and a stop member on the outer end of said element preventing movement thereof into said cylindrical wall.

6. An electric cooking appliance comprising a substantially cylindrical receptacle having upper and lower inwardly projecting flange members and an opening provided in the bottom thereof, an electric heating unit within said receptacle movable from one to the other of said flange members, said unit having an outwardly projecting flange element adapted to cooperate with either of said flange members in order to support said unit in either upper or lower positions, the maximum dimension of said flange element being smaller than the diameter of said receptacle to permit ready movement of said unit between said positions, said flange element including one dimension smaller than a cooperating dimension of said upper flange member so that said unit may be moved into a predetermined transfer position in which said cooperating dimensions permit said flange element to pass through said upper flange member, and a drip pan disposed below and secured to said unit and movable therewith, said drip pan having an opening therein arranged in substantial alignment with the opening provided in the bottom of said receptacle when said unit occupies either of said positions.

7. An electric range comprising a cooking top having an opening therein, a receptacle arranged in said opening, means including a ring disposed about the top of said receptacle and engaging said cooking top for supporting said receptacle in said opening, said receptacle having upper and lower supports, said upper support being a flange member adjacent said ring, a heating unit movable in said receptacle, said unit having a flange member adapting it to rest on said upper or lower supports, one of said flange members having an irregular annular contour with a transverse dimension in one direction greater than the transverse dimension in an angularly disposed direction, the other of said flange members having a maximum transverse dimension intermediate the transverse dimensions of said flange with the irregular annular contour whereby said unit may be moved into cooperative relationship with said supports by angularly displacing said unit so as to provide a space between said flange members, moving said unit past said flange member adjacent the top of said receptacle and thereafter disposing said unit in a position to rest on one of said supports.

8. An electric cooking appliance comprising a receptacle including an upstanding substantially cylindrical wall provided with upper and lower inwardly projecting flange members, an electric heating unit arranged within said receptacle and movable between upper and lower positions therein, means including flange structure carried by said heating unit and adapted selectively to cooperate with said upper and lower flange members for selectively supporting said heating unit in its upper and lower positions, said wall having an upstanding slot formed therein, means including flexible insulated wiring extending through said slot and connected to said heating unit for supplying heating current thereto and for accommodating movement thereof between its upper and lower positions, and means including a hollow element carried by said heating unit and projecting through said slot and surrounding said wiring for protecting said wiring against wear upon the edges of said slot as a result of movement of said heating unit between its upper and lower positions.

FRANCIS E. KIRK.

REFERENCES CITED

The following references are of record in the file of this patent:

UNITED STATES PATENTS

| Number | Name | Date |
|---|---|---|
| 2,260,790 | Russell | Oct. 28, 1941 |
| 2,416,645 | Rutenber | Feb. 25, 1947 |

FOREIGN PATENTS

| Number | Country | Date |
|---|---|---|
| 51,784 | Germany | May 5, 1890 |